Figure 1:
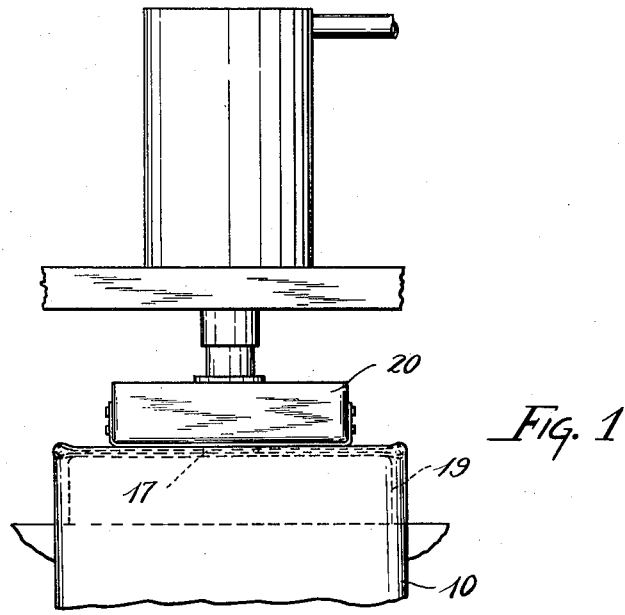

Nov. 4, 1947.  J. L. POLLOCK  2,430,076
METHOD OF WELDING RUBBER INNER TUBES AND LIKE RUBBER ARTICLES
Filed March 3, 1945

INVENTOR.
JOHN L. POLLOCK
BY
Hazard & Miller
ATTORNEYS

Patented Nov. 4, 1947

2,430,076

UNITED STATES PATENT OFFICE 2,430,076

METHOD OF WELDING RUBBER INNER TUBES AND LIKE RUBBER ARTICLES

John L. Pollock, Los Angeles, Calif.

Application March 3, 1945, Serial No. 580,758

10 Claims. (Cl. 154—104)

This invention relates to a method of welding sheet materials, such as sheet rubber, sheet neoprene, canvas, and the like.

It has been primarily devised as a method for repairing inner tubes for truck tires and aircraft tires, but it may be employed for welding or joining the edges of other rubber, rubber-like, or canvas articles. Heretofore, where the inner tubes of truck tires or aircraft tires have been damaged by punctures or blowouts and are badly torn, a common practice has been to scarf the edges of the tube, buff the scarfed edges, apply rubber cement thereto and then position some tube gum between the scarfed edges after which the tube is subjected to heat and pressure to vulcanize the tube gum. A serious objection to this method of repair is that the scarfing of the opposed edges of the tear involves a reduction in the transverse circumference of the tube so that the original contour of the tube is changed or reduced. Consequently, when the tube thus repaired is reinstalled in a casing that portion of the tube which is adjacent the repair is unduly stressed in that it is required to stretch in order to completely fill the casing at this locality. Another objection to the scarfing method is that the amount of tube gum between the scarfed edges is relatively small and the strength of the repair is primarily dependent upon the strength of the vulcanized tube gum and the adhesive bond that it forms with the scarfed edges.

An object of the present invention is to provide an improved method of repairing rubber articles of this character wherein scarfing is eliminated entirely and the original contour of the tube at the location of the repair is not altered. Consequently, when a repaired tube is reinstalled in a casing and inflated the rubber of the tube near the repair will not be unduly stressed.

Another object of the invention is to provide an improved method of repairing sheet rubber articles and the like wherein tube gum is vulcanized between the opposed unscarfed edges of the tear and a second layer of tube gum is vulcanized to the rubber of the tube on its inner or under surface so that in effect an inverted T-shaped patch is formed wherein the major portion of the patch is on the inside of the tube and this portion is vulcanized to areas of the tube on opposite sides of the tear and to the vulcanized tube gum that is disposed between the edges of the tear. In this manner no protuberance of any magnitude is formed on the exterior of the tube with the result that the repaired tube not only has a smooth, attractive external appearance, but is adequately strong against failure.

Still a further object of the invention is to provide an improved method of welding sheet rubber and like articles which can be easily performed by unskilled labor and uniformly successful results obtained.

Figure 2:
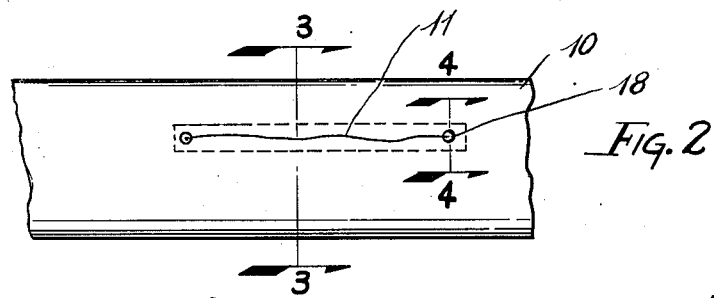
Figures 3, 4:
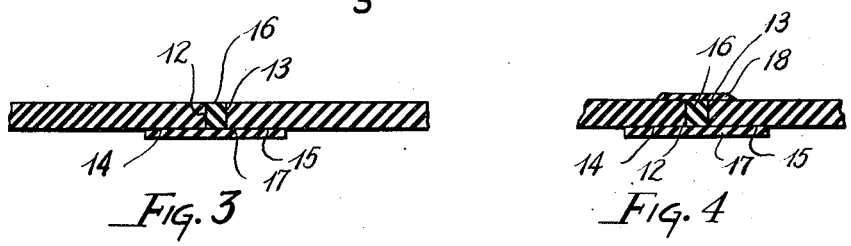

With the foregoing and other objects in view, which will be made manifest in the following detailed description and specifically pointed out in the appended claims, reference is had to the accompanying drawings for an illustrative embodiment of the invention, wherein:

Figure 1 is a view of a rubber welder's bag and vulcanizing table illustrating an inner tube as being vulcanized thereon in accordance with the present invention;

Fig. 2 is a plan view of a section of an inner tube illustrating the manner in which the tear therein is repaired in accordance with the present invention; and Figs. 3 and 4 are sectional views taken substantially upon the lines 3—3 and 4—4, respectively, on Fig. 2.

Referring to the accompanying drawings wherein similar reference characters designate similar parts throughout, inasmuch as the invention has been primarily designed to repair tubes or injuries in inner tubes for tires, it will be described with relation thereto.

In the drawing 10 indicates a conventional rubber inner tube such as that which is employed in truck tires, aircraft tires, and the like. The tube is illustrated as having an irregular tear 11 therein which it is desired to weld. In accordance with the present invention the opposed edges 12 and 13 of the tear are first buffed in any suitable manner such as by holding them against a rotary wire brush, sandpapering them, or rasping them, or the equivalent. Areas 14 and 15 on the under or inner side of the tube are also buffed in a similar manner. In buffing the opposed edges no attempt is made to scarf them and in accordance with the present invention it is desirable to remove as little rubber from the opposed edges as possible so that the transverse contour or shape of the tube will not be changed or reduced. On completion of the buffing operation an application is made of rubber cement. Any relatively quick-setting rubber cement may be employed for this purpose. Thereafter, a relatively thin strip of tube gum 16 is cut and applied to one of the edges 12 or 13. This strip may extend the complete length of the tear 11 provided that the tear is not too long. If the tear is excessively long the entire repair operation herein described is conducted in portions or sections.

The strip 16 in width is approximately equal to the thickness of the walls of the inner tube 10 so that the top edge of the strip lies substantially flush with the top or outer surface of the inner tube and the bottom of the strip lies substantially flush with the bottom or inner surface of the inner tube. A relatively wide strip 17 of tube gum is then applied to one of the areas 14 and 15. This strip as well as the strip 16 will normally adhere to the rubber cement until it has been entirely positioned in place. After the strip 17 has been caused to adhere to area 15, for example, the opposite side of the tear may be applied to cause area 14 to engage strip 17. Simultaneously, edge 12 may be caused to engage strip 16. A stitching tool may then be run over the exterior of the tube adjacent the tear to "stitch" the rubber walls of the tube to both strips 16 and 17. If the tear is relatively long or it is desired to take additional precautionary steps to prevent an extension of the tear, small patches 18 of tube gum may be applied to the exterior of the tube over the ends of the tear. These patches are applied only after the rubber has been buffed at these localities and an application of cement made thereto. The use of these patches on the exterior of the tube is not necessary in all instances and may be regarded as optional. With the tube gum thus applied the tube is then positioned on a vulcanizing table 19 and a rubber welder's bag 20 is positioned thereover. Steam or air pressure may be applied to inflate the welder's bag and to cause it to apply pressure directly over the top of the tear. Steam may be applied to the interior of the vulcanizing table 19. I find that with inner tubes of conventional wall thickness the application of a pressure of approximately 60 pounds per square inch to the bag 20 and approximately 60 pounds steam pressure to the interior of the table for approximately twenty minutes is sufficient to vulcanize the tube gum. This completes the welding operation except that it is thereafter desirable to inflate the tube to break any tendency of the strip 17 to stick to the portion of the tube lying against the vulcanizing table 19.

It will be noted from the above-described method that inasmuch as the opposed edges 12 and 13 are unscarfed and have very little, if any, rubber removed therefrom, that the contour or shape of the tube is not altered. Furthermore, except for the presence of the optional patches 18 there are no protuberances on the exterior of the tube. Consequently, when the tube is reinstalled in a tire casing there is no tendency for it to be abnormally stretched or to wrinkle. The strength of the repair is not dependent solely on the adhesive bond between strip 16 and the edges 12 and 13, but is dependent to a larger extent by the adhesive bond developed between strip 17 and the under areas 14 and 15. In this manner, the tube, in effect, has an inside patch and externally has merely the appearance of a vulcanized rubber seam extending the length of the tear 11. Where the tear 11 is excessive in length I find it advisable to apply the strips 16 and 17 in sections and vulcanize these sections in place before proceeding further along the length of the tear. After one pair of sections 16 and 17 have been applied and vulcanized the operation may be repeated until the tear is completely repaired. The tube gum employed in this method may be any of the conventional tube gums now on the market.

If the inner tube has an exceptional wall thickness in the case of self-sealing or puncture-proof tubes additional time may be required to effect a vulcanization of the tube gum due to the increased wall thickness.

The present invention is not restricted to inner tubes constructed of natural rubber. It is equally applicable to synthetic rubber articles formed of neoprene and is also applicable to repairing or joining sections of canvas. In applying the method to canvas the buffing step may ordinarily be omitted. When the cement is applied it will ordinarily penetrate the canvas fibers and the tube gum will adhere thereto and on being vulcanized will penetrate and form a strong adhesive bond with the canvas.

From the above-described method it will be appreciated that conventional materials may be employed to carry out the present invention. Furthermore, no highly developed skill is required in order to produce uniformly satisfactory results. I find that an inner tube repaired in this manner is sufficiently strong that it will normally outlast the life of the inner tube.

Various changes may be made in the method without departing from the spirit and scope of my invention as defined by the appended claims.

I claim:

1. The method of welding sheet rubber such as the walls of inner tubes and like sheet materials which comprises applying rubber cement to the opposed edges and to areas underlying the edges that are to be joined together, applying a strip of tube gum between the edges, applying a strip of tube gum to the underlying areas and vulcanizing the tube gum by the application of heat and pressure.

2. The method of welding sheet rubber such as the rubber walls of inner tubes and like sheet materials which comprises buffing the opposed edges that are to be joined and areas on the underside of the sheet material adjacent said edges, applying rubber cement to the buffed areas and edges, applying a strip of tube gum to one of the edges, applying a second strip of tube gum to the areas adjacent said edges, and vulcanizing the tube gum by the application of heat and pressure.

3. The method of welding rubber inner tubes and the like which comprises buffing the opposed edges that are to be joined without scarfing them and areas on the inner side of the tube adjacent said edges, applying rubber cement to the buffed edges and areas, applying a strip of tube gum to one of the edges, applying a strip of tube gum to the areas on the inner side of the tube, stitching the tube to said strips of tube gum and vulcanizing the tube gum by the application of heat and pressure.

4. The method of welding rubber inner tubes and the like which have been torn which comprises buffing without scarfing the opposed edges of the tear and areas on the inner side of the tube adjacent the tear, applying rubber cement to the buffed edges and areas, applying a strip of tube gum to one of the edges, applying a second strip of tube gum to the areas on the inner side of the tube on each side of the tear, causing the opposed edge to engage the first-mentioned strip of tube gum, and vulcanizing the tube gum by the application of heat and pressure.

5. The method of welding rubber inner tubes and the like which comprises buffing areas on the inner side of the tube adjacent the edges thereof that are to be joined, applying rubber cement to the buffed areas, applying a strip of tube gum to the areas on the inner side of the tube to extend across said edges, and vulcanizing the tube gum by the application of heat and pressure.

6. The method of welding rubber inner tubes and the like which comprises buffing the opposed edges that are to be joined and areas on the inner side of the tube adjacent said edges, buffing areas at the ends of the edges that are to be joined on the upper or outer side thereof, applying rubber cement to the buffed edges and areas, applying a strip of tube gum between the edges, applying a second strip of tube gum to the areas on the inner side of the tube to extend across said edges, applying patches of tube gum to the exterior of the tube at the ends of the edges to be joined, and vulcanizing the tube gum by the application of heat and pressure.

7. The method of welding rips in sheet rubber such as the walls of inner tubes and like sheet materials which comprises applying rubber cement to the opposed edges of the rip and to the areas adjoining said edges on the under side of the sheet, applying an underlying strip of tube gum extending longitudinally of the rip to one of said areas with a portion projecting laterally therebeyond so as to be engageable by the other area, applying a narrow strip of tube gum extending longitudinally of the rip to one of its side edges, positioning the other side of the rip so that its edge abuts said narrow strip and its cemented area engages the laterally projecting portion of the underlying strip, and vulcanizing the tube gum by the application of heat and pressure.

8. The method of welding rips in sheet rubber such as the walls of inner tubes and the like which comprises buffing the edges of the rip and areas on the under side of the sheet adjoining the edges of the rip, applying cement to said edges and areas, applying a section of tube gum to one of the edges of the rip so as to be ultimately connected to the other edge of the rip, applying a strip of tube gum to one of the areas on the underside of the sheet so that it projects laterally beyond the adjoining edge of the rip, positioning the other side of the rip so that its edge abuts the side of the first-mentioned section of tube gum and its area engages the laterally projecting portion of the second-mentioned section of tube gum, and vulcanizing the tube gum by the application of heat and pressure.

9. The method of welding rips in sheet rubber such as the walls of inner tubes and the like which comprises buffing the edges of the rip and areas on the under side of the sheet adjoining the edges of the rip, applying cement to said edges and areas, applying a section of tube gum to one of the edges of the rip so as to be ultimately connected to the other edge of the rip, applying a strip of tube gum to one of the areas on the underside of the sheet so that it projects laterally beyond the adjoining edge of the rip, positioning the other side of the rip so that its edge abuts the side of the first-mentioned section of tube gum and its area engages the laterally projecting portion of the second-mentioned section of tube gum, stitching the tube to said strips of tube gum and vulcanizing the tube gum by the application of heat and pressure.

10. The method of welding rips in sheet rubber such as the walls of inner tubes and like sheet materials which comprises buffing the edges of the rip and areas on the under side of the sheet adjoining the edges of the rip, applying cement to said edges and areas, applying a section of tube gum having a thickness approximately equal to the thickness of the sheet to one of the edges of the rip to be ultimately connected to the other edge of the rip, applying a strip of tube gum to one of the areas on the under side of the sheet so that it projects laterally beyond the adjoining edges of the rip, positioning the other side of the rip so that its edge abuts the side of the first-mentioned section of tube gum and its area engages the laterally projecting portion of the second-mentioned section of tube gum, applying patches of tube gum to the exterior or upper side of the sheet at the ends of the rip and vulcanizing the tube gum by the application of heat and pressure.

JOHN L. POLLOCK.

REFERENCES CITED

The following references are of record in the file of this patent:

UNITED STATES PATENTS

| Number | Name | Date |
| --- | --- | --- |
| 1,058,447 | Mahoney | Apr. 8, 1913 |
| 1,340,965 | McAllister | May 25, 1920 |
| 2,273,464 | Campbell et al. | Feb. 17, 1942 |
| 2,339,559 | Charnes | Jan. 18, 1944 |
| 1,621,154 | Cox | Mar. 15, 1927 |
| 581,235 | Kenyon | Apr. 20, 1897 |
| 787,010 | Tingley | Apr. 11, 1905 |
| 1,975,149 | Heintz | Oct. 2, 1934 |